UNITED STATES PATENT OFFICE.

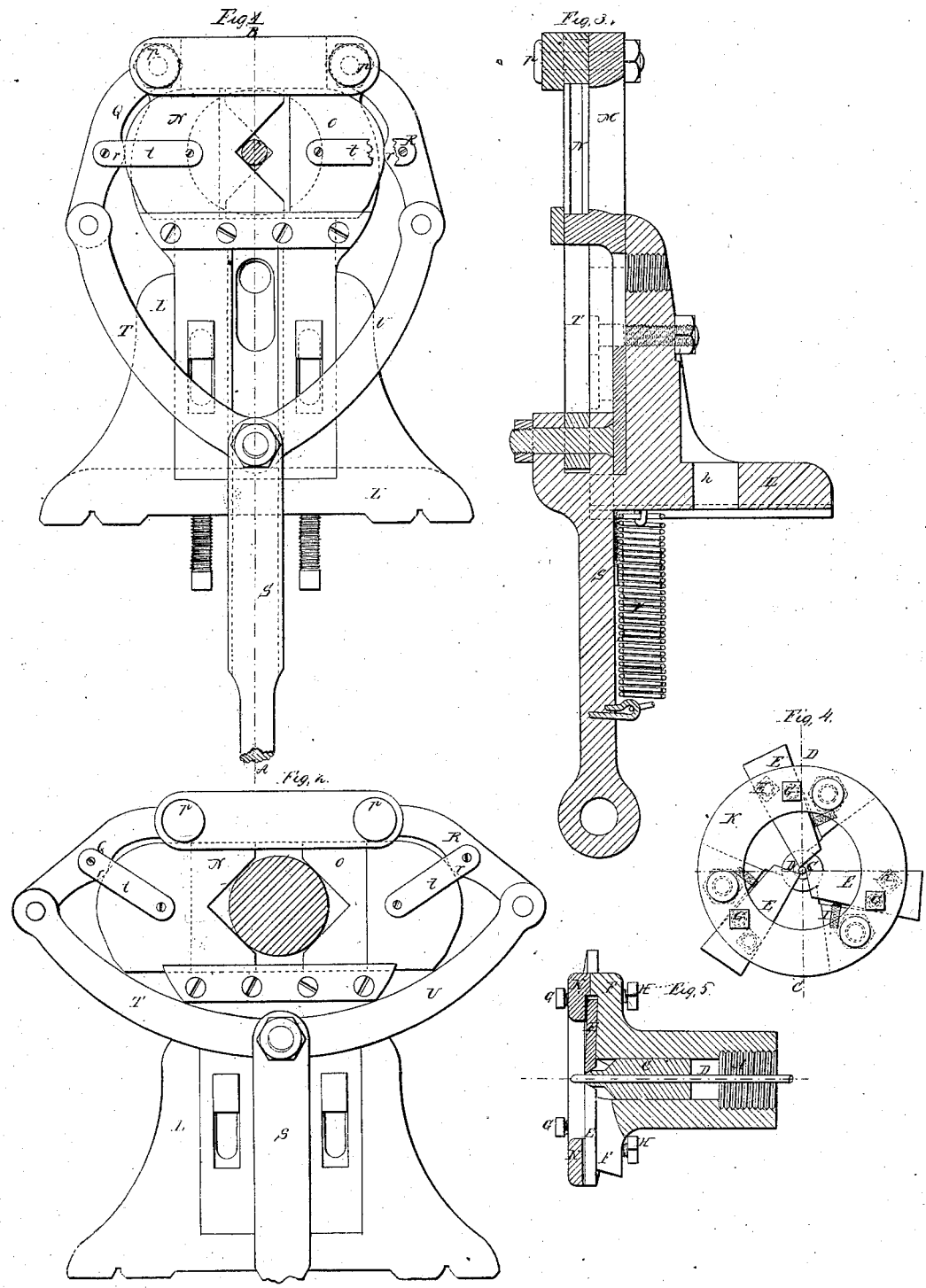

NATHAN F. NEWELL, OF NORTHBRIDGE, MASSACHUSETTS.

CENTERING BARS OF IRON.

Specification of Letters Patent No. 31,257, dated January 29, 1861.

*To all whom it may concern:*

Be it known that I, NATHAN F. NEWELL, of Northbridge, in the county of Worcester, in the State of Massachusetts, have invented a new and Improved Mode of Centering and Squaring Up the Ends of Iron on other Material to be Turned into Shafting, &c.; and I do hereby declare that the following is a full, clear, and exact description of the same, reference being had to the accompanying drawings, making part of this specification, and to the letters of reference marked thereon, in which—

Figure 1, is a front elevation of a stand with jaws and the parts for moving them, shown grasping ½ inch diameter iron to be operated on. Fig. 2, is an elevation of the same showing the position of the parts when grasping 2 inch diameter iron. Fig. 3, is a section through same at line A B. Fig. 4, is a front elevation of the chuck, with the cutters for squaring up and drill for centering. Fig. 5 is a section through same at line, C D.

The most common way of centering the ends of iron for shafting has been to mark the axis approximately with a prick punch, then by putting one of the pricked holes on a dead center of the lathe to drill into the other by a suitable drill fixed in the revolving spindle of the headstock, holding the piece to be drilled by hand or aided by a fixed fork. The material in being cut off by shears, or otherwise, is flattened or changed from the cylindrical form at the ends, so as to make it difficult to strike the axis by the old method of centering, and a waste of iron in turning is the consequence; as also a loss of time, and power.

The object of my invention is to seize the material to be centered and squared, a short distance from the end, where the shape has not been altered in cutting off, and hold and guide it, so that its axis shall be in a line with the centers of the engine lathe, while the cutters and drill in the chuck, on the revolving spindle, square the ends, and center it simultaneously.

To enable others skilled in the art to make, and use my invention, I will proceed to describe its construction, and operation. I apply to an ordinary engine lathe, a chuck, Figs. 4 and 5, which is screwed to the end of the revolving spindle by the thread A. This chuck has a center, C, which has a hole through its center to receive the drill, D, which drill is made of steel wire of the proper size, so that it can be fed up as the cutting end is worn away; the chuck has three or more cutters, E, with their cutting edges in the same plane, and at right angles to the axis of the part to be squared: these cutters are secured in the flange, F, of the chuck, and adjusted and held firmly by the screws, G, H, I.

K, is a ring secured to the outer face of the chuck to aid in securing the cutters, E. To use in combination with the chuck, I construct the carriage, L, Figs. 1, 2, and 3, which is made to slide over the ways of the lathe which serve as a guide, and is fixed by a bolt through the hole, *h*. The stand, L, has a hole or opening, M, of convenient form and size for entering the piece to be operated upon. The sliding jaws N, O (which are shown the form best adapted for square or round iron, but any other form may be made to suit the piece of iron to be centered) are made to close upon the piece to be centered and squared with sufficient power to hold and guide it, but not so hard as to prevent its being fed up to the drill and cutters.

Levers, Q, R, are secured to the stand, L, by pins or bolts, *p*, on which they turn freely; these levers are connected with the vertical sliding bar S by means of the parts, T, U. The bar S is brought up for opening the jaws by the spring V.

In operating, a bar of iron or other material, is placed on a rest near the tail end of the lathe while the other end of the bar is entered through the opening, M, and the dies or jaws, N, O. The operator then presses upon a treadle which is secured to the sliding bar, S, drawing it down, which forces the projection, *r*, on the levers, Q, R, against the backs of the jaws forcing them together till they grasp the piece to be centered and squared; the center in the dead spindle is then moved up against the piece causing it to be fed up to the drill, D, and cutters, E. The weight of the piece acting on the lower inclined planes of the jaws, when the foot is lifted from the treadle is usually sufficient to open the jaws, but the withdrawal of them is rendered more certain by means of the links, *t*.

I am aware that sliding jaws for such purposes have been moved by right and left screws, and that cutters for squaring up the ends, and drills for centering at the same operation have been used, but I believe that my arrangement is most convenient and useful—and have squared and centered with it over 8,000 pieces for shafting within the past 3 months and could have done much more.

Having thus described its construction and operation what I claim as my invention and desire to secure by Letters Patent is—

The combination of chuck, with the jaws operated by levers, bar, treadle, &c., herein described, for the purpose of centering and squaring up the ends of material to be turned.

NATHAN F. NEWELL.

Witnesses:
P. W. DUDLEY,
GEO. L. GIBBS.